US012563493B2

(12) United States Patent
Li et al.

(10) Patent No.: US 12,563,493 B2
(45) Date of Patent: Feb. 24, 2026

(54) NETWORK-INDICATION-BASED CHANNEL MONITORING METHOD AND APPARATUS, AND USER EQUIPMENT

(71) Applicant: VIVO MOBILE COMMUNICATION CO., LTD., Guangdong (CN)

(72) Inventors: Na Li, Guangdong (CN); Xiaodong Shen, Guangdong (CN); Xueming Pan, Guangdong (CN); Kai Wu, Guangdong (CN); Dongru Li, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 448 days.

(21) Appl. No.: 18/110,943

(22) Filed: Feb. 17, 2023

(65) Prior Publication Data

US 2023/0199648 A1     Jun. 22, 2023

Related U.S. Application Data

(63) Continuation of application No. PCT/CN2021/119855, filed on Sep. 23, 2021.

(30) Foreign Application Priority Data

Sep. 25, 2020     (CN) .......................... 202011027660.0

(51) Int. Cl.
*H04W 52/02*          (2009.01)
(52) U.S. Cl.
CPC ............................... *H04W 52/0225* (2013.01)

(58) Field of Classification Search
CPC . H04W 52/0225; H04W 24/08; H04W 52/02; H04W 52/0216; H04W 52/0229; H04W 52/0248; Y02D 30/70; H04L 5/00; H04L 5/0053
See application file for complete search history.

(56) References Cited

U.S. PATENT DOCUMENTS

| | | | | |
|---|---|---|---|---|
| 2020/0229092 A1* | 7/2020 | Wu | ........................ | H04W 76/28 |
| 2022/0052821 A1* | 2/2022 | Kim | .................. | H04W 72/0446 |
| 2022/0369351 A1* | 11/2022 | Sakhnini | ............... | H04L 5/0098 |

FOREIGN PATENT DOCUMENTS

| | | |
|---|---|---|
| CN | 111527773 A | 8/2020 |
| EP | 3681207 A1 | 7/2020 |
| WO | 2020146796 A1 | 7/2020 |

OTHER PUBLICATIONS

Extended European Search Report for Application No. 21871537.3, dated Dec. 2, 2024, 9 Pages.

(Continued)

*Primary Examiner* — Walli Z Butt
(74) *Attorney, Agent, or Firm* — BROOKS KUSHMAN P.C.

(57)          ABSTRACT

A channel monitoring method and apparatus, and a user equipment are disclosed. The method includes: receiving, by the UE, first information sent by a network device, where the first information is used for indicating a monitoring behavior of the UE on a downlink control channel, and the first information includes at least one of the following: time information or frequency domain information; and monitoring or stopping monitoring, by the UE, a target downlink control channel according to the first information.

20 Claims, 4 Drawing Sheets

(56) References Cited

OTHER PUBLICATIONS

Vivo "PDCCH-based power saving signal/channel design" 3GPP TSG RAN WG1 #96bis, Xi'an, China, Apr. 2019, R1-1904103, 7 Pages.

CATT "Staqe-2 running CR for support of UE Power Saving in NR" 3GPP TSG-RAN WG2 Meeting #108, Reno, USA, Nov. 2019, R2-1914523, 20 Pages.

Partial Supplementary European Search Report for Application No. 21871537.3, dated Jul. 25, 2024, 15 Pages.

Second Office Action for Chinese Application No. 202011027660.0, dated Jan. 13, 2024, 11 Pages.

Huawei, HiSilicon "Further discussion on the impact of DCI-based PDCCH skipping" 3GPP TSG-RAN2 Meeting#106, Reno, USA, May 2019, R2-1906904, 6 Pages.

First Office Action for European Application No. 21871537.3, dated Feb. 14, 2024, 6 Pages.

5G New Radio: A Beam-based Air Interface "Network Architecture and NR Radio Protocols" Dawid Koziol and Helka-Liina Määttänen, 2020, 69 Pages.

First Office Action for Japanese Application No. 2023-519105, dated Mar. 26, 2024,3 Pages.

Vivo "PDCCH-based power saving signal/channel" 3GPP TSG RAN WG1 #97, Reno, USA, May 2019, R1- 1906170, 10 Pages.

First Office Action for Chinese Application No. 202011027660.0, dated Jun. 9, 2023, 12 Pages.

Huawei, HiSilicon "Extension(s) to Rel-16 DCI-based power saving adaptation for an active BWP" 3GPP TSG RAN WG1 Meeting #102-e, E-meeting, Aug. 2020, R1-2005264, 7 Pages.

Moderator (vivo) "FL summary#4 of potential extension(s) to Rel-16 DCI-based power saving adaptation during DRX ActiveTime" 3GPP TSG RAN WG1 Meeting #102-e, e-Meeting, Aug. 2020, R1-2007400, 64 Pages.

Huawei, HiSilicon "Discussion on the impact of DCI-based power saving adaptation" 3GPP TSG-RAN2 Meeting#105bis, Xian, China, Apr. 2019, R2-1904968, 3 Pages.

International Search Report and Written Opinion for Application No. PCT/CN2021/119855, dated Nov. 25, 2021, 9 Pages.

Vivo "Discussion on PDCCH monitoring skipping and PDCCH monitoring periodicity switch" 3GPP TSG RAN WG1 #97, Reno, USA, May 2019, R1-1906172, 4 Pages.

CMCC "Discussion on PDCCH-based power saving signal/channel design" 3GPP TSG RAN WG1 #97, Reno, USA, May 2019, R1-1906524, 10 Pages.

Qualcomm Incorporated "PDCCH-based power saving channel design" 3GPP TSG-RAN WG1 #97, Reno, USA, May 2019, R1-1907294, 16 Pages.

CATT "Summary of PDCCH-based Power Saving Signal/Channel" 3GPP TSG RAN WG1 #97, Reno, China, May 2019, R1-1907809, 10 Pages.

Huawei, HiSilicon "Other considerations on UE power saving" 3GPP TSG RAN WG1 Meeting #99, Reno, USA, Nov. 2019, R1-1911874, 8 Pages.

ZTE "Views on power saving enhancement" 3GPP TSG RAN WG1 #100bis, e-Meeting, Apr. 2020, R1-2001586, 11 Pages.

* cited by examiner

NETWORK-INDICATION-BASED CHANNEL MONITORING METHOD AND APPARATUS, AND USER EQUIPMENT

CROSS-REFERENCE TO RELATED APPLICATIONS

This application is a continuation of International Application No. PCT/CN2021/119855 filed on Sep. 23, 2021, which claims priority to Chinese Patent Application No. 202011027660.0 filed on Sep. 25, 2020, which are incorporated herein by reference in their entireties.

TECHNICAL FIELD

This application relates to the field of communications technologies, and specifically, to a channel monitoring method and apparatus, and a user equipment.

BACKGROUND

In a communication system, during monitoring a physical downlink control channel (PDCCH), a user equipment (UE) may periodically monitor the PDCCH in a discontinuous reception (DRX) manner to receive downlink data, uplink data, or the like. That is, the UE periodically enters a sleep mode sometimes and does not monitor the PDCCH. When monitoring is required, the UE wakes up from the sleep mode, monitors and receives the PDCCH, so as to achieve an objective of saving power.

However, during the foregoing process, there may be data required for transmission when the UE is in the sleep mode, but in this case, the UE does not monitor the PDCCH until it is switched to a wake up mode, which therefore may cause a delay in data transmission, thereby leading to relatively poor performance of the data transmission.

SUMMARY

According to a first aspect, an embodiment of this application provides a channel monitoring method, including: receiving, by a UE, first information sent by a network device, where the first information is used for indicating a monitoring behavior of the UE on a downlink control channel, and the first information includes at least one of the following: time information or frequency domain information; and monitoring or stopping monitoring, by the UE, a target downlink control channel according to the first information.

According to a second aspect, an embodiment of this application provides a channel monitoring apparatus, including a receiving module and a processing module. The receiving module is configured to receive first information sent by a network device, where the first information is used for indicating a monitoring behavior of a UE on a downlink control channel, and the first information includes at least one of the following: time information or frequency domain information. The processing module is configured to monitor or stop monitoring a target downlink control channel according to the first information received by the receiving module.

According to a third aspect, an embodiment of this application provides a UE, including a processor, a memory, and a program or instruction stored on the memory and runnable on the processor, where when the program or instruction is executed by the processor, the steps of the channel monitoring method according to the first aspect are implemented.

According to a fourth aspect, an embodiment of this application provides a readable storage medium, storing a program or instruction, where when the program or instruction is executed by a processor, the steps of the channel monitoring method according to the first aspect are implemented.

According to a fifth aspect, an embodiment of this application provides a chip, including a processor and a communication interface, where the communication interface is coupled to the processor, and the processor is configured to run a program or instruction to implement the channel monitoring method according to the first aspect.

DETAILED DESCRIPTION

Figure 1:
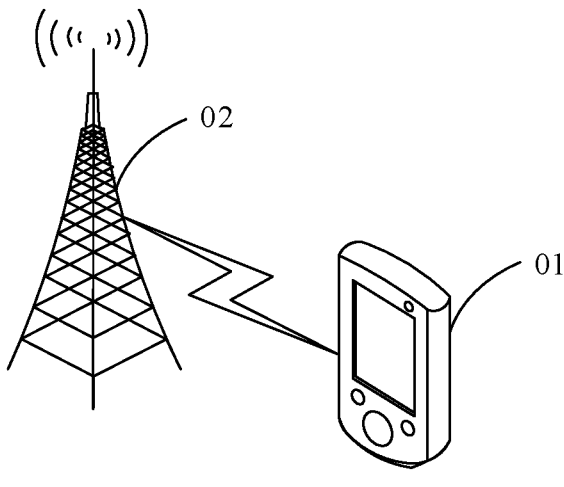
FIG. 1 is a schematic architectural diagram of a communication system according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application shall fall within the protection scope of this application.

In the specification and claims of this application, the terms "first", "second", and the like are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, "and/or" in this specification and the claims represents at least one of the connected objects, and a character "/" used herein generally indicates an "or" relationship between associated objects.

Some concepts and/or terms involved in the channel monitoring method and apparatus, and the user equipment provided in the embodiments of this application are explained and described below.

Radio resource control (RRC)-connected (RRC-connected) DRX: A DRX cycle is composed of an "On Duration" and an "Opportunity for DRX". A UE monitors and receives a physical downlink control channel (PDCCH) during an "On Duration" time; and the UE does not monitor the PDCCH during an "Opportunity for DRX" time to reduce power consumption. If a newly transmitted PDCCH is received during the "On Duration" time, a timer (inactivity timer) will be started or restarted to prolong a duration of monitoring the PDCCH for the UE.

Long/short DRX cycle: The UE may be configured with a short DRX cycle or a long DRX cycle by a system according to different service scenarios respectively. For example, during performing a VOIP service, a speech codec usually sends a VOIP packet in 20 ms, then a short DRX cycle with a length of 20 ms may be configured, and the long DRX cycle may be configured in a relatively long silent period during a voice call. If the UE is configured with the short DRX cycle and the long DRX cycle simultaneously, and a DRX-short cycle timer expires, then the UE will enter one long DRX cycle. Transformation of the long/short DRX cycle:

Case 1: If the UE receives the PDCCH in an On Duration timer interval, a DRX-inactivity timer will be triggered; if the DRX-inactivity timer expires, the DRX-short cycle timer will be triggered; and if the DRX-short cycle timer expires, the long DRX cycle will be used.

Case 2: If the PDCCH is received in the long DRX cycle, the short DRX cycle will be triggered to be used.

The DRX-inactivity timer is used for reducing a delay in processing data. However, if a duration of the DRX-inactivity timer is set excessively long, the DRX-inactivity timer does not expire after data of a network side is all sent, then the UE continues to monitor a downlink subframe and cannot enter the sleep mode in time. To let the UE enter the sleep mode quickly, one DRX-related media access control-control element (MAC-CE) is introduced in the system. After the UE receives this DRX-related MAC-CE, a drx-onDurationTimer and the DRX-inactivity timer will be stopped. A specific process is as follows: If the UE receives a DRX command MAC CE or a long DRX command MAC CE, then the drx-onDurationTimer or the DRX-inactivity timer will be stopped. If a DRX command MAC CE is received, and a short DRX cycle is configured, a DRX-short cycle timer will be started or restarted in a first symbol after reception of the DRX command MAC CE ends, and the short DRX cycle will be started to be used; otherwise, a long DRX cycle will be started to be used. If the DRX-short cycle timer expires, the long DRX cycle will be used. If a long DRX command MAC CE is received, the DRX-short cycle timer will be stopped and the long DRX cycle will be started to be used.

It can be learned that, currently, it is supported that the DRX command MAC CE is used for ending the drx-onDurationTimer and the DRX-inactivity timer, and the long DRX command MAC CE may further end L (L≥1, determined by the DRX-short cycle timer) short DRX cycles. Therefore, the UE may end an active time and start to monitor the PDCCH when the UE enters an on duration of a next DRX cycle. However, the DRX command MAC CE cannot dynamically control and adjust PDCCH monitoring in one or K (K<L) short DRX cycles.

DCP: A DCI format 2-6 with a cyclic redundancy check scrambled by a packet switch-radio network temporary identifier (DCI format 2_6 with CRC scrambled by PS-RNTI). To further save energy under a DRX configuration, the network side may further configure the UE with the DCP in a case that a connected DRX (C DRX) mechanism is configured. A wake up indication field in the DCP is used for instructing the UE whether to start a drx-onDurationTimer of a next DRX cycle, or instructing the DCP to instruct an MAC layer whether to start the drx-onDurationTimer of a next DRX cycle. Starting of a timer means that the UE needs to monitor the PDCCH during the timer running, otherwise, the UE does not monitoring the PDCCH.

Two information fields of a current DCI format 2-6:

The wake up indication field (1 bit) is indeed used for instructing the UE whether to start the drx-onDurationTimer of a next DRX cycle; and a secondary cell dormancy indication (SCell dormancy indication) (0, 1, 2, 3, 4, 5 bits) field is used for instructing an SCell of the UE whether to enter a dormant state under carrier aggregation (CA). In addition, the SCell dormancy indication field in the DCI format 2-6 is used for using an SCell group as a unit to instruct the SCell group whether to switch to a dormant bandwidth part (BWP). Each bit in the field correspondingly instructs one SCell group.

SCell dormancy indication in an active period: An SCell dormancy indication may be sent through scheduling a DCI format in an active period. One case is that physical downlink shared channel (PDSCH) and physical uplink shared channel (PUSCH) are scheduled simultaneously through a DCI format 1-1 and a DCI format 0-1, and the SCell dormancy indication is sent. Another case is that the SCell dormancy indication is sent through the DCI format 1-1 and the PDSCH is not scheduled.

Same slot scheduling: A PDCCH in a current slot schedules a PDSCH in the same slot. After receiving a PDCCH of two symbols, the UE needs extra processing time for demodulating the PDCCH to obtain downlink control information (DCI) transmitted by the PDCCH, where the DCI includes resource block (RB) allocation information and the like. Therefore, before obtaining the RB allocation information, the UE needs to buffer an entire bandwidth/a PDSCH of the BWP.

Cross-slot scheduling: A PDCCH in a current slot schedules a PDSCH in a subsequently different slot. If the UE may learn a time range within which the UE will not be scheduled and received or sent in advance, then the UE can place a radio frequency (RF), a part of front end hardware, and another modem hardware of the UE in a state of a power-saving mode. For example, after receiving the PDCCH of two symbols, the UE has a sufficient time to perform decoding to obtain content (DCI) transmitted by the PDCCH, where the content includes the RB allocation information and the like. Therefore, the UE only needs to receive a corresponding PDSCH on a related RB.

It is to be noted that the technologies described in the embodiments of this application are not limited to a long term evolution (LTE)/LTE-advanced (LTE-Advanced, LTE-A) system, and may be further applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described can be applied to the systems and radio technologies mentioned above, and can also be applied to other systems and radio technologies. However, the following exemplarily describes a new radio (NR) system, and NR terms are used in most of the descriptions below.

These technologies can also be applied to applications other than NR system applications, for example, a 6$^{th}$ generation (6G) communication system.

Exemplarily, FIG. 1 shows a schematic architectural diagram of a communication system according to an embodiment of this application. As shown in FIG. 1, the communication system includes a UE 01 and a network device 02. A connection and communication may be established between the UE 01 and the network device 02.

The UE in this embodiment of this application may also be referred to as a terminal device, and the UE may be a terminal side device, such as a mobile phone, a tablet personal computer, a laptop computer or a notebook computer, a personal digital assistant (PDA), a handheld computer, a netbook, an ultra-mobile personal computer (UMPC), a mobile internet device (MID), a wearable device (wearable device), an in-vehicle user equipment (VUE), or a pedestrian user equipment (PUE). The wearable device includes: a hand ring, a headset, a pair of glasses, or the like. It is to be noted that, a specific type of the UE is not limited in this embodiment of this application.

The network device in this embodiment of this application may be a base station or a core network, where the base station may be referred to as a node B, an evolved node B, an access point, a base transceiver station (BTS), a radio base station, a radio transceiver, a basic service set (BBS), an extended service set (ESS), a home node B, a home evolved node B, a WLAN access point, a WiFi node, a transmitting receiving point (TRP), or another proper term in the field as long as achieving the same technical effects. The base station is not limited to a specific technical word. It is to be noted that, only a base station in an NR system is used as an example in this embodiment of this application, but a specific type of the base station is not limited.

A channel monitoring method according to the embodiments of this application is described in detail below with reference to the accompanying drawings through specific embodiments and application scenarios thereof.

In the embodiments of this application, a monitoring behavior of the UE on a downlink control channel is dynamically defined through monitoring-related signaling (for example, first information described in the following embodiment) of the downlink control channel. The UE may skip monitoring the downlink control channel (that is, a corresponding downlink control channel is not monitored) according to the monitoring-related signaling, or monitor the corresponding downlink control channel, so as to monitor the downlink control channel flexibly and avoid a delay in data transmission caused by failing to monitor the downlink control channel in time.

Figure 2:
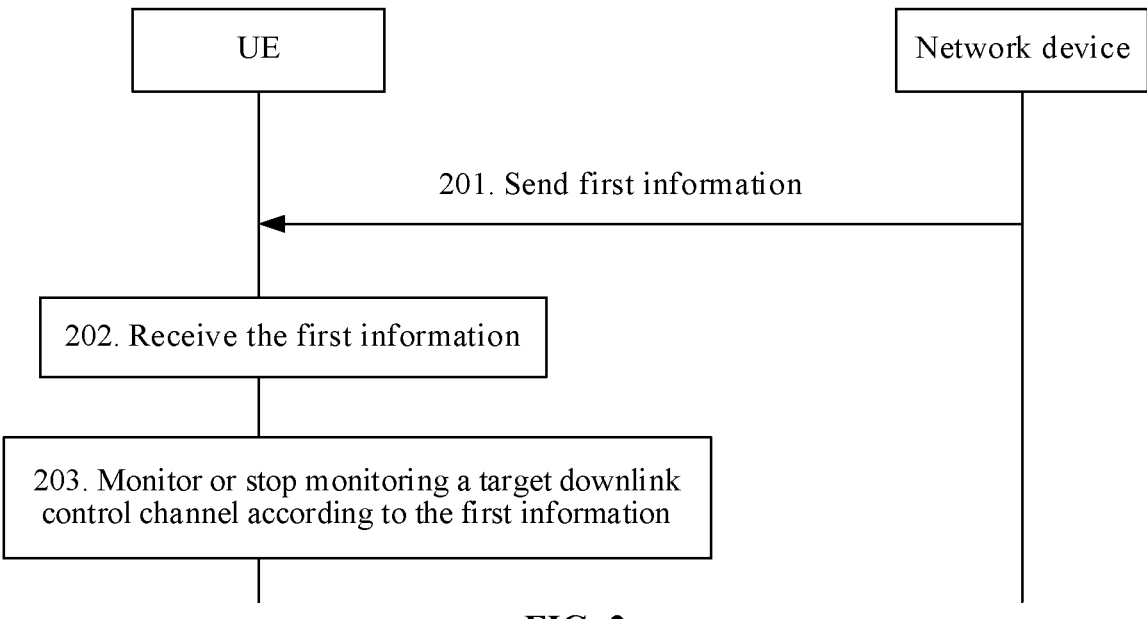
FIG. 2 is a schematic diagram of a channel monitoring method according to an embodiment of this application.

An embodiment of this application provides a channel monitoring method, and FIG. 2 shows a flowchart of the channel detection method provided in this embodiment of this application. As shown in FIG. 2, the channel monitoring method provided in this embodiment of this application may include the following step 201 to step 203.

Step 201: A network device sends first information to a UE.

Optionally, in this embodiment of this application, the network device may send the first information to the UE and a higher layer (for example, a medium access control (MAC) layer) of a UE side.

Step 202: The UE receives the first information sent by the network device.

In this embodiment of this application, the foregoing first information is used for indicating a monitoring behavior of the UE on a downlink control channel (for example, a PDCCH), and the first information includes at least one of the following: time information or frequency domain information.

In this embodiment of this application, the foregoing first information may be downlink control channel monitoring signaling to instruct the UE to monitor the downlink control channel, or may be downlink control channel skipping signaling (for example, PDCCH skipping signaling) to instruct the UE to skip monitoring the downlink control channel.

Optionally, in this embodiment of this application, the foregoing time information includes at least one of the following: a start time or an application time. The start time is a time of starting to monitor or starting to stop monitoring the downlink control channel, and the application time is a duration of monitoring or stopping monitoring the downlink control channel.

It is to be noted that, the foregoing start time may also be referred to as an effective time.

Optionally, in an implementation of this embodiment of this application, in a case that the first information is DCI, the start time is any one of the following: a next time unit, a time indicated by the DCI, a first time, or a second time.

The next time unit is a next time unit of a time unit in which the DCI is received, the first time is a time determined according to a symbol in which the DCI is received, and the second time is specified in a protocol or configured by a higher layer according to a processing capability of the UE.

Optionally, in this embodiment of this application, in a case that the foregoing first information is DCI (for example, UE-specific or group common DCI) and the DCI schedules data/a signal (or the DCI does not schedule data/a signal (for example, a reference signal)), the start time of the first information is any one of the following: a next time unit, a time indicated by the DCI, a first time, or a second time.

Optionally, in this embodiment of this application, the foregoing next time unit may be any one of the following: a next symbol, a next slot, a next monitoring occasion, a next short DRX cycle, a next long DRX cycle, or the like.

It is to be noted that, the time indicated by the DCI may be understood as that the DCI includes a specific start time.

Optionally, in this embodiment of this application, in a case that the foregoing start time is the first time, that the first time is a time determined according to a symbol in which the DCI is received may be understood as that the start time is related to a position of a symbol in which the DCI is received, that is, the UE may determine the start time (that is the effective time of the first information) according to a position of a slot corresponding to a symbol (for example, a start symbol or an end symbol in which the DCI is located) in which the DCI is located.

Exemplarily, if a slot in which the PDCCH skipping signaling is located is numbered n, and the PDCCH skipping signaling is located in first three symbols of one slot, the PDCCH skipping signaling takes effect in a next slot (that is an n+1 slot). When the PDCCH skipping signaling is located in a position after a third symbol of one slot, the PDCCH skipping signaling takes effect in an n+2 slot.

Optionally, in this embodiment of this application, in a case that the foregoing DCI is a wake up-signal (WUS), the foregoing start time is a next DRX duration (that is a next DRX on duration) indicated by the WUS.

Optionally, in this embodiment of this application, in a case that the foregoing DCI is used for indicating BWP switching, the start time is a time after the BWP switching.

It may be understood that if the PDCCH skipping signaling is PDCCH skipping signaling after the BWP switching (for example, switching from a BWP #1 to a BWP #2, or switching from a dormant BWP to a non-dormant BWP) indicated by the DCI, the start time of the PDCCH skipping signaling is the time after the BWP switching.

Optionally, in this embodiment of this application, in a case that the foregoing DCI schedules a downlink data channel (for example, a PDSCH), the foregoing start time is a time determined according to a slot in which the downlink data channel is located and a third slot quantity, and the third slot quantity is a quantity of slots in which uplink control channel (for example, a PUCCH) transmission feeding back acknowledgement information to the downlink data channel is located.

It is to be noted that, if the DCI schedules the PDSCH simultaneously, and the scheduling is same slot scheduling or cross-slot scheduling, the start time of the PDCCH skipping signaling is m+k1, m is a slot in which the PDSCH is located, and k1 is a quantity of slots or sub-slots in which PUCCH transmission feeding back HARQ-ACK/ACK information to the PDSCH is located.

Optionally, in this embodiment of this application, in a case that the foregoing DCI schedules an uplink data channel, the start time is a time determined according to a slot in which the DCI is located and a quantity of slots in which the uplink data channel is scheduled.

It is to be noted that, if the DCI schedules a PUSCH simultaneously, the start time of the PDCCH skipping signaling is t+k2+Δ, t is a slot in which the DCI is located, k2 is a quantity of slots in which the PUSCH is scheduled, k2 may be indicated by the DCI scheduling the PUSCH, Δ is a quantity of slots or symbols configured by a higher layer (that is RRC), and a value of Δ may be 0.

Optionally, in another implementation of this embodiment of this application, in a case that the foregoing first information is a media access control-control element (MAC CE), the start time is any one of the following: a third time or a fourth time.

The third time is a time after a preset duration of a slot in which the MAC CE is received, and the fourth time is a time determined according to the slot in which the MAC CE is received, a first slot quantity, and a second slot quantity. The first slot quantity is a quantity of slots in which uplink control channel transmission feeding back acknowledgement information to a downlink data channel in which the received MAC CE is located is located, and the second slot quantity is a quantity of slots occupied by each subframe of a sub-carrier space (SCS) used for the uplink control channel transmission.

It is to be noted that, if the first information (that is the PDCCH skipping signaling) is the MAC CE, the start time of the PDCCH skipping signaling is 4 ms+a slot in which the MAC CE is received, or $k3+3\times N_{slot}^{subframe,u}+1+a$ slot in which the MAC CE is located, k3 is a quantity of slots in which PUCCH transmission feeding back HARQ-ACK information to a PDSCH in which the received MAC CE is located is located, k3 may be indicated by a value of a PDSCH-to-HARQ_feedback timing indicator field in the DCI format scheduling the PDSCH, and $N_{slot}^{subframe,u}$ is a quantity of slots occupied by each subframe of an SCS used for the PUCCH transmission.

Optionally, in this embodiment of this application, the foregoing application time is any one of the following: a first duration, a second duration, an end time, a third duration, a target slot, or a monitoring occasion.

The first duration is a duration of N continuous or discontinuous short DRX cycles after a time unit in which the first information is received, the second duration is a duration of M continuous or discontinuous long DRX cycles after the time unit in which the first information is received, the end time is a time of finishing monitoring or finishing stopping monitoring the downlink control channel, the third duration is a time length of monitoring or stopping monitoring the downlink control channel, the target slot is a slot of monitoring or stopping monitoring the downlink control channel, the monitoring occasion is an occasion of monitoring or stopping monitoring the downlink control channel, and N and M are both positive integers.

Optionally, in this embodiment of this application, the foregoing first duration may be specifically a duration (a duration of an on duration timer of a short DRX cycle) of N continuous or discontinuous short DRX cycles after a symbol, slot, monitoring occasion, or DRX cycle in which the first information (the PDCCH skipping signaling) is received. It is to be noted that, descriptions of the foregoing second duration are similar to those of the foregoing first duration, and details are not described herein again.

Optionally, in this embodiment of this application, the foregoing time length may be any one of the following: X slots, X symbols, X PSCCH monitoring occasions, or X PDCCH monitoring spans (monitoring span), and X is a positive integer.

It is to be noted that, the foregoing time length may be continuous, or may be discontinuous. For example, the foregoing slots/symbols are downlink slots/symbols, or slots/symbols (that is, uplink or downlink slots/symbols) in a flexible direction. The foregoing PDCCH monitoring occasions/monitoring spans are for PDCCHs including a specific type (a type-0, a type-0A, a type-1, or a type-2) of CSS.

Optionally, in this embodiment of this application, the foregoing frequency domain information includes at least one of the following: a preset quantity of cells/component carriers (component carrier, CC), a BWP, a frequency range (FR), a physical resource block (PRB), or a cell group corresponding to a cell.

It may be understood that the network device may use the first information to indicate a cell/component carrier, a BWP, a FR, PRBs and/or cell groups on which monitoring or stopping monitoring the PDCCH is performed to the UE.

It is to be noted that, the foregoing cell group corresponding to a cell may be a cell group corresponding to a secondary cell, which may be understood as that: a plurality of cells (for example, primary cells (PCell), primary secondary cell (PSCell), and/or secondary cells (SCell)) are divided into a plurality of cell groups (cell group), and the PDCCH skipping signaling may indicate a cell group on which monitoring or stopping monitoring the PDCCH is performed.

Step 203: The UE monitors or stops monitoring a target downlink control channel according to the first information.

In this embodiment of this application, after receiving the first information, the UE may monitor or stop monitoring the target downlink control channel under indication of the start time included by the first information within the application time included by the first information.

Optionally, in this embodiment of this application, if the foregoing PDCCH skipping signaling occupies x bit(s), and one bit in the x bit(s) indicates whether to stop monitoring the PDCCH, when a value of the one bit is 0, the value represents skipping monitoring the target downlink control channel (for example, skipping monitoring the PDCCH in a specified period of time for a specified PDCCH search space, a specified control resource set (CORESET), a specified DCI format, or a specified aggregation level (AL)); and when a value of the one bit is 1, the value represents monitoring the target downlink control channel.

It is to be noted that, the foregoing target downlink control channel may be preconfigured by the network device, predetermined by the UE, or indicated by the first information. That is, after receiving the first information, the UE learns which downlink control channels are required to be monitored or stopped monitoring.

Optionally, in this embodiment of this application, the foregoing target downlink control channel includes at least one of the following: all downlink control channels in a UE specific search space (USS), all downlink control channels in a first preset type of common search space (CSS), a downlink control channel other than a downlink control channel corresponding to a specific DCI format in the first preset type of CSS, all downlink control channels in a CSS, or a specific downlink control channel.

Optionally, in this embodiment of this application, the foregoing specific downlink control channel is configured by a higher layer or indicated by the first information.

Optionally, in this embodiment of this application, the foregoing first information indicates second information, and the specific downlink control channel is determined by the second information. The second information includes at least one of the following: a search space set, a DCI format, an aggregation level, a control resource set (CORESET), an RNTI, or a resource block set (RB set).

Optionally, in this embodiment of this application, the foregoing target downlink control channel includes at least all the downlink control channels in a first preset type of CSS. After the foregoing step 202, the channel monitoring method provided in this embodiment of this application further includes the following step 301.

Step 301: The UE monitors a second downlink control channel.

In this embodiment of this application, the foregoing second downlink control channel includes at least one of the following: all downlink control channels in another type of CSS, a downlink control channel scrambled by an RNTI in the another type of CSS, a downlink control channel other than a downlink control channel scrambled by a specific RNTI in the another type of CSS, or the downlink control channel corresponding to a specific DCI format in the first preset type of CSS. The another type of CSS is a CSS other than the first preset type of CSS.

Optionally, in this embodiment of this application, the foregoing first preset type of CSS may be a type-3 CSS, the foregoing another type of CSS may be a type-0 CSS, a type-0A CSS, a type-1 CSS or a type-2 CSS, and the foregoing specific DCI format may be a DCI format 2-6.

Optionally, in this embodiment of this application, in a case that the foregoing first information is used for a downlink control channel corresponding to the DCI format 2-6, an "on duration" timer of a DRX cycle corresponding to the DCI format 2-6 may be started or not started according to a configuration (or predefinition) of the RRC.

Optionally, in this embodiment of this application, the foregoing downlink control channel scrambled by an RNTI may include at least one of the following: a downlink control channel scrambled by a system information RNTI (SI-RNTI), a downlink control channel scrambled by a paging RNTI (P-RNTI), a downlink control channel scrambled by a random access RNTI (RA-RNTI), a downlink control channel scrambled by a temporary cell RNTI (TC-RNTI), a downlink control channel scrambled by a cell RNTI (C-RNTI), a downlink control channel scrambled by a modulation and coding scheme-C-RNTI (MCS-C-RNTI), or a downlink control channel scrambled by a configured scheduling RNTI (CS-RNTI).

Optionally, in this embodiment of this application, the foregoing specific RNTI may be any one of the following: a C-RNTI, an MCS-C-RNTI, or a CS-RNTI.

It is to be noted that, a performing order of the foregoing step 301 and step 203 is not limited in this embodiment of this application. In one manner, the foregoing step 203 may be performed first, and then the foregoing step 301 may be performed. That is, the UE may monitor or stop monitoring the target downlink control channel according to the first information first, and then monitor the second downlink control channel. In another manner, the foregoing step 301 may be performed first, and then the foregoing step 203 may be performed. That is, the UE may monitor the second downlink control channel first, and then monitor or stop monitoring the target downlink control channel according to the first information. Still another, the foregoing step 203 and the foregoing step 301 may be performed simultaneously. That is, the UE may monitor or stop monitoring the target downlink control channel according to the first information, and simultaneously monitor the second downlink control channel.

Optionally, in this embodiment of this application, the foregoing step 203 may be specifically implemented through the following step 203a.

Step 203a: The UE monitors or stops monitoring the target downlink control channel according to the first information in a case that a preset condition is met.

In this embodiment of this application, the foregoing preset condition includes at least one of the following: a cell in which the UE is located is a secondary cell, the cell in which the UE is located is a secondary cell scheduling a primary cell in a cross-carrier manner, a frequency corresponding to the cell in which the UE is located is within a target frequency range, the UE is in a target state, the UE monitors the downlink control channel according to other monitoring-related information, or a BWP on a component carrier corresponding to the downlink control channel is in a non-dormant state.

It is to be noted that, the foregoing other monitoring-related information may be understood as information used for monitoring the downlink control channel. Performing monitoring the downlink control channel according to the other monitoring-related information may achieve an objective of reducing power consumption of the UE.

Optionally, in this embodiment of this application, the foregoing other monitoring-related information includes at least one of the following: DRX cycle-related information, a WUS, cross-slot scheduling indication information, or secondary cell dormancy indication (SCell dormancy indication) information.

Optionally, in this embodiment of this application, the foregoing DRX cycle-related information may include at least one of the following: DRX inactivity time (inactivity timer) information, HARQ round-trip time time (RTT timer) information, or retransmission time (retransmission timer) information.

Optionally, in this embodiment of this application, the foregoing PDCCH skipping signaling may also be applicable to all cells. That is, the UE may monitor or stop monitoring the target downlink control channel according to the first information in all secondary cells, primary cells (PCell), primary secondary cells (PSCell), or PUCCH secondary cells (PUCCH SCell). For example, if the UE is located in a primary cell or a primary secondary cell, the UE may stop monitoring a PDCCH on the primary cell or the primary secondary cell and continue to monitor or skip monitoring a PDCCH on another secondary cell, or, the UE may continue monitoring PDCCHs on all cells in a cell group in which the primary cell or the primary secondary cell is located.

Figures 3, 4, 5, 6:
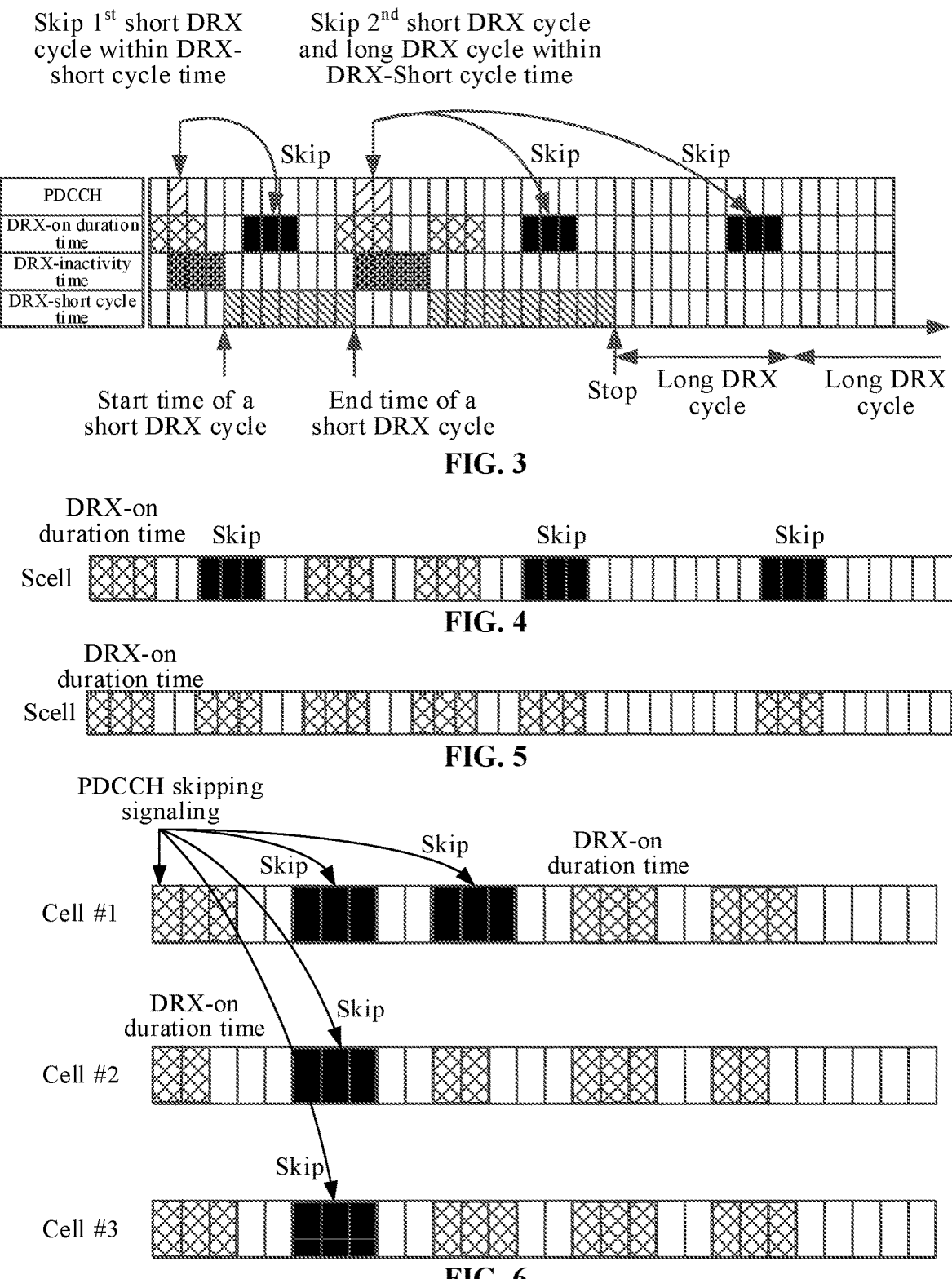
FIG. 3 is a schematic diagram 1 of a channel monitoring example according to an embodiment of this application.
FIG. 4 is a schematic diagram 2 of a channel monitoring example according to an embodiment of this application.
FIG. 5 is a schematic diagram 3 of a channel monitoring example according to an embodiment of this application.
FIG. 6 is a schematic diagram 4 of a channel monitoring example according to an embodiment of this application.

Exemplarily, as shown in FIG. 3, according to the PDCCH skipping signaling acting on the PCell, PSCell, or PUCCH SCell, the UE skips monitoring the PDCCH in a DRX-on duration time (on duration timer) in a corresponding short DRX cycle or long DRX cycle. For example, PDCCH monitoring within the $1^{st}$ short DRX cycle is skipped within a DRX short cycle time (DRX short cycle timer) (that is, skip $1^{st}$ short DRX cycle within DRX-short cycle time); and PDCCH monitoring within the $2^{nd}$ short DRX cycle and long DRX cycle is skipped within a DRX short cycle time (DRX short cycle timer) (that is, skip $2^{nd}$ short DRX cycle and long DRX cycle within DRX-Short cycle time).

Exemplarily, FIG. 4 shows that an SCell is affected by a PCell, PSCell, and PUCCH in the same cell group. That is, the PDCCH monitoring in a DRX-on duration time (on duration timer) is skipped according to the PDCCH skipping signaling.

Exemplarily, FIG. 5 shows that an SCell is not affected by a PCell, PSCell, and PUCCH in the same cell group. That is, the PDCCH monitoring in a DRX-on duration time (on duration timer) is not skipped.

Optionally, in this embodiment of this application, the UE may stop monitoring a PDCCH on a secondary cell (SCell) and continue to monitor a PDCCH on a primary cell or a primary secondary cell.

Optionally, in this embodiment of this application, for dynamic spectrum sharing (DSS), that is, a scenario that a primary cell may be scheduled by a secondary cell in a cross-carrier manner, the PDCCH skipping signaling is not applicable to a secondary cell that may schedule a primary cell in a cross-carrier manner.

Optionally, in this embodiment of this application, the foregoing target state may be any one of the following: an RRC-connected state, an idle state, or an inactive state.

Optionally, in this embodiment of this application, the PDCCH skipping signaling may be applied to a UE (a UE in an idle state or inactive state) supporting small data transmission or early data transmission.

Optionally, in this embodiment of this application, the PDCCH skipping signaling may be applied to joint DCI in the DSS, that is, the joint DCI schedules a plurality of CCs.

It is to be noted that, in a case that the PDCCH skipping signaling is applicable to a UE in an idle state or inactive state, the PDCCH skipping signaling may instruct the UE (the UE in an idle state or inactive state) supporting the small data transmission or the early data transmission whether to continue to monitor a PDCCH scheduling small data or early data. In a case that the PDCCH is combined with a DCI-based WUS, and is used for the UE in an idle state or inactive state, the PDCCH skipping signaling may also indicate whether to skip monitoring a paging PDCCH.

Optionally, in this embodiment of this application, if the PDCCH skipping signaling acts on a group of CCs (a plurality of CCs), and if a current active BWP on a CC is a dormant BWP, the UE ignores the PDCCH skipping signaling, that is, the PDCCH skipping signaling only acts on a CC on which a current active BWP is a non-dormant BWP.

Optionally, in this embodiment of this application, if the PDCCH skipping signaling acts on one CC, the PDCCH skipping signaling should not act on a CC on which a current active BWP is a dormant BWP, that is, if the UE receives such PDCCH skipping signaling, the PDCCH skipping signaling is regarded as wrong information.

Exemplarily, FIG. 6 shows that one piece of PDCCH skipping signaling acts on a plurality of CCs and supports a cross-carrier indication, that is, for a plurality of CCs, through sending one piece of PDCCH skipping signaling, all the plurality of CCs may skip PDCCH monitoring based on the piece of PDCCH skipping signaling. For example, sending one piece of PDCCH skipping signaling in a cell #1 may act on the cell #1, a cell #2, and a cell #3, so that all UEs in these cells may skip monitoring a specified PDCCH on a specified time (for example, a DRX-on duration time (on duration timer)) and frequency range based on the piece of PDCCH skipping signaling.

Figures 7, 8, 9:
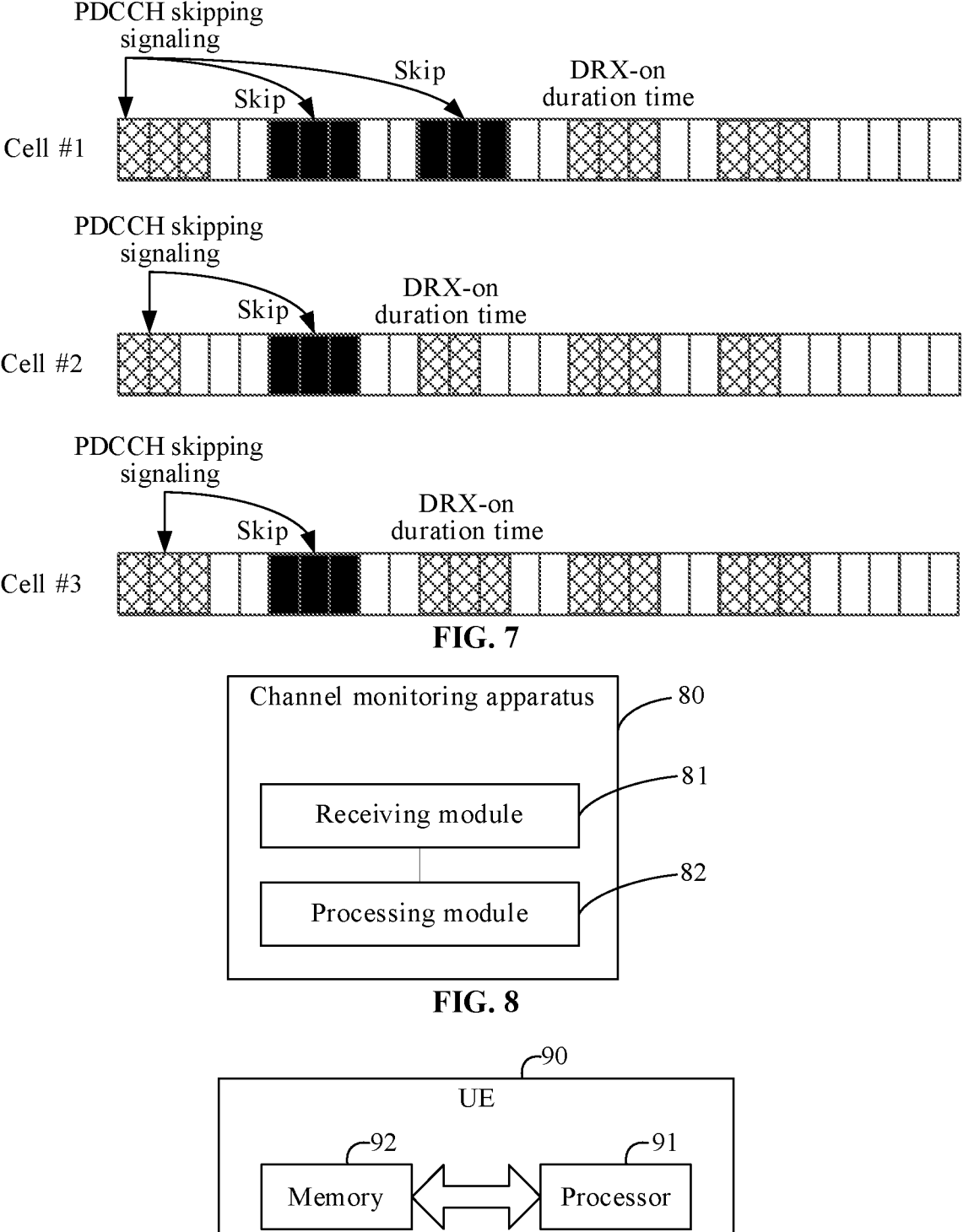
FIG. 7 is a schematic diagram 5 of a channel monitoring example according to an embodiment of this application.
FIG. 8 is a schematic structural diagram of a channel monitoring apparatus according to an embodiment of this application.
FIG. 9 is a schematic diagram 1 of a hardware structure of a UE according to an embodiment of this application.

Exemplarily, FIG. 7 shows that one piece of PDCCH skipping signaling acts on one CC and supports a self-carrier indication, that is, for a plurality of CCs, through sending a plurality of PDCCH skipping signaling (that is, each CC corresponds to one piece of PDCCH skipping signaling respectively), all the plurality of CCs may skip PDCCH monitoring based on corresponding PDCCH skipping signaling. For example, sending one piece of PDCCH skipping signaling in a cell #1 may act on the cell #1, so that a UE in the cell #1 may skip monitoring a specified PDCCH on a specified time (for example, a DRX-on duration time (on duration timer)) and frequency range based on the piece of PDCCH skipping signaling. Processes for the cell #2 and cell #3 are similar to a process of the cell #1, and details are not described herein again.

In this embodiment of this application, the first information may be applied to a primary cell or a primary secondary cell, or works independently of DRX, to reduce power consumption of the UE and ensuring performance of the UE simultaneously.

Optionally, in this embodiment of this application, the foregoing step 203 may be specifically implemented through the following step 203b or step 203c.

Step 203b: The UE monitors or stops monitoring the target downlink control channel according to the first information in a case that the UE does not initiate a competition-based random access process.

Step 203c: The UE monitors or stops monitoring the target downlink control channel according to the first information in a case that the UE initiates the competition-based random access process and receives a random access message scheduled by a downlink control channel scrambled by using a specific RNTI.

Optionally, in this embodiment of this application, the foregoing specific RNTI may be any one of the following: a C-RNTI, a CS-RNTI, a TC-RNTI, or an MCS-C-RNTI.

Optionally, in this embodiment of this application, the foregoing step 203c may be replaced by the following step 203d.

Step 203d: The UE ignores the first information in a case that the UE initiates the competition-based random access process and does not receive the random access message (for example, a Msg 4) scheduled by the downlink control channel scrambled by using the specific RNTI.

It is to be noted that, that the UE ignores the first information may be understood as that the UE does not monitor or stop monitoring the target downlink control channel according to an indication of the first information.

Optionally, in this embodiment of this application, it may not be expected that the UE receives a random access message scheduled by a PDCCH scrambled by using a specific RNTI on a PDCCH indicated to be skipped in a case that the UE initiates the competition-based random access process and does not receive the random access message scheduled by the downlink control channel scrambled by using the specific RNTI, or the UE initiates non-competition random access.

In this embodiment of this application, in a case that the UE initiates the competition-based random access process, random access may be protected through this scheme from being affected by the first information.

In this embodiment of this application, more dynamic downlink control channel monitoring control and adjustment performed in one or more continuous or discontinuous short DRX cycles may be implemented on time; and downlink control channel monitoring control and adjustment of one or more CCs may be implemented on frequency.

According to the channel monitoring method provided in this embodiment of this application, the UE may monitor or stop monitoring the target downlink control channel according to the first information sent by the network device. During monitoring the downlink control channel, because the UE may flexibly monitor a corresponding downlink control channel on time or on frequency domain according to a dynamic indication of the network device, which avoids the delay of data transmission caused by skipping monitoring the downlink control channel, power consumption is reduced. In addition, performance of the data transmission is improved.

Optionally, in this embodiment of this application, after the foregoing step 202, the channel monitoring method provided in this embodiment of this application further includes the following step 401.

Step 401: The UE transmits third information in a case that a cell in which the UE is located is a target cell.

In this embodiment of this application, the foregoing third information includes at least one of the following: first hybrid automatic repeat request-acknowledgment HARQ-ACK information, second HARQ-ACK information, first channel state information (CSI), second CSI, a first scheduling request (SR), or a second SR. The target cell is any one of the following: a primary cell, a primary secondary cell, or a secondary cell corresponding to an uplink control channel. Physical layer priorities of the first HARQ-ACK information and the second HARQ-ACK information are different, physical layer priorities of the first CSI and the second CSI are different, and physical layer priorities of the first SR and the second SR are different.

It may be understood that if the PDCCH skipping signaling acts on the primary cell, the primary secondary cell, or the secondary cell corresponding to an uplink control channel, transmission of a part of UCI (uplink control information), for example, high-priority HARQ-ACK information, a high-priority SR, and/or high-priority CSI, or, HARQ-ACK information of all priorities (high-priority HARQ-ACK information and low-priority HARQ-ACK information), SRs of all priorities (a high-priority SR and a low-priority SR), and/or CSI of all priorities (high-priority CSI and low-priority CSI), is not affected.

It is to be noted that, a performing order of the foregoing step 401 and step 203 is not limited in this embodiment of this application.

Optionally, in this embodiment of this application, after the foregoing step 202, the channel monitoring method provided in this embodiment of this application may further include the following step 501.

Step 501: In a case that the UE is configured with fourth information, the UE transmits or skips transmitting the fourth information.

In this embodiment of this application, the foregoing fourth information includes at least one of the following: a first configured grant (configured grant, CG) uplink data channel, a second CG uplink data channel, a first semi-persistent scheduling (semi-persistent scheduling, SPS) downlink data channel, a second SPS downlink data channel, first semi-persistent channel state information (semi-persistent CSI, SP-CSI), second SP-CSI, a first SR, or a second SR. Physical layer priorities of the first CG uplink data channel and the second CG uplink data channel are different, physical layer priorities of the first SPS downlink data channel and the second SPS downlink data channel are different, physical layer priorities of the first SP-CSI and the second SP-CSI are different, and physical layer priorities of the first SR and the second SR are different.

In this embodiment of this application, in a case that the UE is configured with the fourth information, the UE may transmit or skip transmitting the fourth information according to an RRC configuration or a predefined rule.

It is to be noted that, a performing order of the foregoing step 501 and step 203 is not limited in this embodiment of this application.

Optionally, in this embodiment of this application, after the foregoing step 501, the channel monitoring method provided in this embodiment of this application further includes the following step 502.

Step 502: The UE starts a target timer, and monitors a retransmitted first downlink control channel within a running duration of the target timer.

In this embodiment of this application, the foregoing target timer is a DRX-retransmission timer or a DRX-HARQ round-trip time-timer (DRX-HARQ-RTT-timer). The foregoing first downlink control channel is any one of the following: a downlink control channel in any type of search space, a downlink control channel in a second preset type of CSS, or another downlink control channel other than the target downlink control channel.

It may be understood that if the UE transmits a CG PUSCH and/or an SPS PDSCH without PDCCH, the UE may start an uplink target timer and/or a downlink target timer, and monitor, within the running duration of the target timer, a retransmitted PDCCH that may be scheduled. A type of a search space in which the retransmitted PDCCH is located is not limited, or, the search space in which the retransmitted PDCCH is located is the second preset type of CSS (for example, a type-0, type-0A, type-1 or type-2 CSS). In addition, the retransmitted PDCCH is another PDCCH other than a skipped PDCCH indicated by the PDCCH skipping signaling, or the retransmitted PDCCH is transmitted in a newly introduced fallback/PDCCH-skipping free PDCCH search space.

Optionally, in this embodiment of this application, no matter whether the UE starts the uplink and/or downlink target timer or not, within the running duration of the target timer, the UE no longer monitors the retransmitted PDCCH that may be scheduled.

It may be understood that if the UE transmits an SR, the UE monitors a PDCCH, and a type of a search space in which the PDCCH is located is not limited, or the search space in which the PDCCH is located is the second preset type of CSS. In addition, the PDCCH is the another PDCCH other than a skipped PDCCH indicated by the PDCCH skipping signaling, or the PDCCH is transmitted in the newly introduced fallback/PDCCH-skipping free PDCCH search space.

It is to be noted that, for the fallback/PDCCH-skipping free PDCCH search space: the PDCCH skipping signaling does not act on a PDCCH transmitted in the PDCCH search space, which is a UE-specific search space.

Optionally, in this embodiment of this application, when a start of an MAC layer timer or a process of an MAC layer causes a situation that the UE is located in a DRX active time and/or the UE needs to monitor a PDCCH, the UE monitors the PDCCH in the fallback/PDCCH-skipping free PDCCH search space.

Optionally, in this embodiment of this application, if the UE is configured with at least one of the following: periodic channel state information (periodic CSI, P-CSI), SP-CSI, a periodic-sounding reference signal (P-SRS), or a semi-persistent sounding reference signal (semi-persistent SRS, SP-SRS), the UE may transmit or skip transmitting this information (that is, the P-CSI, SP-CSI, P-SRS, and SP-SRS) according to the RRC configuration or predefined rule.

Optionally, in this embodiment of this application, for an SSB and a CORESET #0 multiplexing pattern 3 (multiplexing pattern 3), the SSB and the PDCCH are frequency-division multiplexed, and on a to-be-measured SSB symbol, the UE monitors a PDCCH of a type-0-PDCCH CSS and a corresponding PDSCH.

It is to be noted that, the channel monitoring method provided in this embodiment of this application may be performed by the UE, a channel monitoring apparatus, or a control module configured to perform and load the channel monitoring method in the channel monitoring apparatus. In an embodiment of this application, that the UE performs and loads the channel monitoring method is taken as an example for description of the channel monitoring apparatus provided in this embodiment of this application.

FIG. 8 shows a possible schematic structural diagram of a channel monitoring apparatus involved in an embodiment of this application. As shown in FIG. 8, a channel monitoring apparatus 80 may include a receiving module 81 and a processing module 82.

The receiving module 81 is configured to receive first information sent by a network device, where the first information is used for indicating a monitoring behavior of a UE on a downlink control channel, and the first information includes at least one of the following: time information or frequency domain information. The processing module 82 is configured to monitor or stop monitoring a target downlink control channel according to the first information received by the receiving module 81.

In a possible implementation, the foregoing time information includes at least one of the following: a start time or an application time, where the start time is a time of starting to monitor or starting to stop monitoring the downlink control channel, and the application time is a duration of monitoring or stopping monitoring the downlink control channel. The foregoing frequency domain information includes at least one of the following: a preset quantity of cells/component carriers, a BWP, a frequency range, a PRB, or a cell group corresponding to a cell.

In a possible implementation, in a case that the first information is DCI, the foregoing start time is any one of the following: a next time unit, a time indicated by the DCI, a first time, or a second time. In a case that the first information is a MAC CE, the foregoing start time is any one of the following: a third time or a fourth time. The next time unit is a next time unit of a time unit in which the DCI is received, the first time is a time determined according to a symbol in which the DCI is received, and the second time is specified in a protocol or configured by a higher layer. The third time is a time after a preset duration of a slot in which the MAC CE is received, the fourth time is a time determined according to the slot in which the MAC CE is received, a first slot quantity, and a second slot quantity, the first slot quantity is a quantity of slots in which uplink control channel transmission feeding back acknowledgement information to a downlink data channel in which the received MAC CE is located is located, and the second slot quantity is a quantity of slots occupied by each subframe of an SCS used for the uplink control channel transmission.

In a possible implementation, in a case that the DCI is a WUS, the foregoing start time is a next DRX duration indicated by the WUS. In a case that the DCI is used for indicating BWP switching, the foregoing start time is a time after the BWP switching. In a case that the DCI schedules a downlink data channel, the foregoing start time is a time determined according to a slot in which the downlink data channel is located and a third slot quantity, and the third slot quantity is a quantity of slots in which uplink control channel transmission feeding back the acknowledgement information to the downlink data channel is located. In a case that the DCI schedules an uplink data channel, the foregoing start time is a time determined according to a slot in which the DCI is located and a quantity of slots in which the uplink data channel is scheduled.

In a possible implementation, the foregoing application time is any one of the following: a first duration, a second duration, an end time, a third duration, a target slot, or a monitoring occasion. The first duration is a duration of N continuous or discontinuous short DRX cycles after a time unit in which the first information is received, the second duration is a duration of M continuous or discontinuous long DRX cycles after the time unit in which the first information is received, the end time is a time of finishing monitoring or finishing stopping monitoring the downlink control channel, the third duration is a time length of monitoring or stopping monitoring the downlink control channel, the target slot is a slot of monitoring or stopping monitoring the downlink control channel, the monitoring occasion is an occasion of monitoring or stopping monitoring the downlink control channel, and N and M are both positive integers.

In a possible implementation, the foregoing processing module 82 is specifically configured to monitor or stop monitoring the target downlink control channel according to the first information in a case that a preset condition is met. The foregoing preset condition includes at least one of the following: a cell in which the UE is located is a secondary cell, the cell in which the UE is located is a secondary cell scheduling a primary cell in a cross-carrier manner, a frequency corresponding to the cell in which the UE is located is within a target frequency range, the UE is in a target state, the UE monitors the downlink control channel according to other monitoring-related information, or a BWP on a component carrier corresponding to the downlink control channel is in a non-dormant state.

In a possible implementation, the foregoing other monitoring-related information includes at least one of the following: DRX cycle-related information, a WUS, cross-slot scheduling indication information, or secondary cell dormancy indication information.

In a possible implementation, the foregoing target downlink control channel includes at least one of the following: all downlink control channels in a USS, all downlink control channels in a first preset type of CSS, a downlink control channel other than a downlink control channel corresponding to a specific DCI format in the first preset type of CSS, all downlink control channels in a CSS, or a specific downlink control channel.

In a possible implementation, the foregoing specific downlink control channel is configured by a higher layer or indicated by the first information.

In a possible implementation, the foregoing first information indicates second information, and the specific downlink control channel is determined by the second information. The second information includes at least one of the following: a search space set, a DCI format, an aggregation level, a control resource set, an RNTI, or a resource block set.

In a possible implementation, the foregoing target downlink control channel includes at least all the downlink control channels in a first preset type of CSS. The foregoing processing module 82 is further configured to monitor a second downlink control channel after the receiving module 81 receives the first information sent by the network device. The second downlink control channel includes at least one of the following: all downlink control channels in another type of CSS, a downlink control channel scrambled by an RNTI in the another type of CSS, a downlink control channel other than a downlink control channel scrambled by a specific RNTI in the another type of CSS, or the downlink control channel corresponding to a specific DCI format in the first preset type of CSS. The another type of CSS is a CSS other than the first preset type of CSS.

In a possible implementation, the foregoing processing module 82 is further configured to, after the receiving module 81 receives the first information sent by the network device, transmit third information in a case that a cell in which the UE is located is a target cell, where the third information includes at least one of the following: first HARQ-ACK information, second HARQ-ACK information, first CSI, second CSI, a first SR, or a second SR. The target cell is any one of the following: a primary cell, a primary secondary cell, or a secondary cell corresponding to an uplink control channel. Physical layer priorities of the first HARQ-ACK information and the second HARQ-ACK information are different, physical layer priorities of the first CSI and the second CSI are different, and physical layer priorities of the first SR and the second SR are different.

In a possible implementation, the foregoing processing module 82 is further configured to, after the receiving module 81 receives the first information sent by the network device, in a case that the UE is configured with fourth information, transmit or skip transmitting the fourth information. The fourth information includes at least one of the following: a first CG uplink data channel, a second CG uplink data channel, a first SPS downlink data channel, a second SPS downlink data channel, first SP-CSI, second SP-CSI, a first SR, or a second SR. Physical layer priorities of the first CG uplink data channel and the second CG uplink data channel are different, physical layer priorities of the first SPS downlink data channel and the second SPS downlink data channel are different, physical layer priorities of the first SP-CSI and the second SP-CSI are different, and physical layer priorities of the first SR and the second SR are different.

In a possible implementation, the foregoing processing module 82 is further configured to, after transmitting or skipping transmitting the fourth information, start a target timer and monitor a retransmitted first downlink control channel within a running duration of the target timer. The target timer is a DRX retransmission timer or a DRX-HARQ round-trip time-timer. The first downlink control channel is any one of the following: a downlink control channel in any type of search space, a downlink control channel in a second preset type of CSS, or another downlink control channel other than the target downlink control channel.

In a possible implementation, the foregoing processing module 82 is specifically configured to monitor or stop monitoring the target downlink control channel according to the first information in a case that the UE does not initiate a competition-based random access process; or monitor or stop monitoring the target downlink control channel according to the first information in a case that the UE initiates the competition-based random access process and receives a random access message scheduled by a downlink control channel scrambled by using a specific RNTI.

In a possible implementation, the foregoing processing module 82 is further configured to ignore the first information in a case that the UE initiates the competition-based random access process and does not receive the random access message scheduled by the downlink control channel scrambled by using the specific RNTI.

The channel monitoring apparatus provided in this embodiment of this application can implement all processes implemented by the UE in the foregoing method embodiments. Details are not described herein again to avoid repetition.

According to the channel monitoring apparatus provided in this embodiment of this application, during monitoring the downlink control channel, because the UE may flexibly monitor a corresponding downlink control channel on time or on frequency domain according to a dynamic indication of the network device, which avoids the delay of data transmission caused by skipping monitoring the downlink control channel, power consumption is reduced. In addition, performance of the data transmission is improved.

The channel monitoring apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or a self-service machine, which are not specifically limited in this embodiment of this application.

The channel monitoring apparatus in this embodiment of this application may be an apparatus with an operating system. The operating system may be an Android operating system, an ios operating system, or another possible operating system, which is not specifically limited in this embodiment of this application.

The channel monitoring apparatus provided in this embodiment of this application can implement all processes implemented by the UE in the foregoing method embodiments. Details are not described herein again to avoid repetition.

Optionally, as shown in FIG. 9, an embodiment of this application further provides a UE 90, including a processor 91, a memory 92, and a program or instruction stored in the memory 92 and runnable on the processor 91, where when the program or instruction is executed by the processor 91, each process of the foregoing method embodiments are implemented, and the same technical effects can be achieved. To avoid repetition, details are not described herein again.

It is to be noted that, the UE in this embodiment of this application includes the foregoing mobile electronic device and the foregoing non-mobile electronic device.

Figure 10:
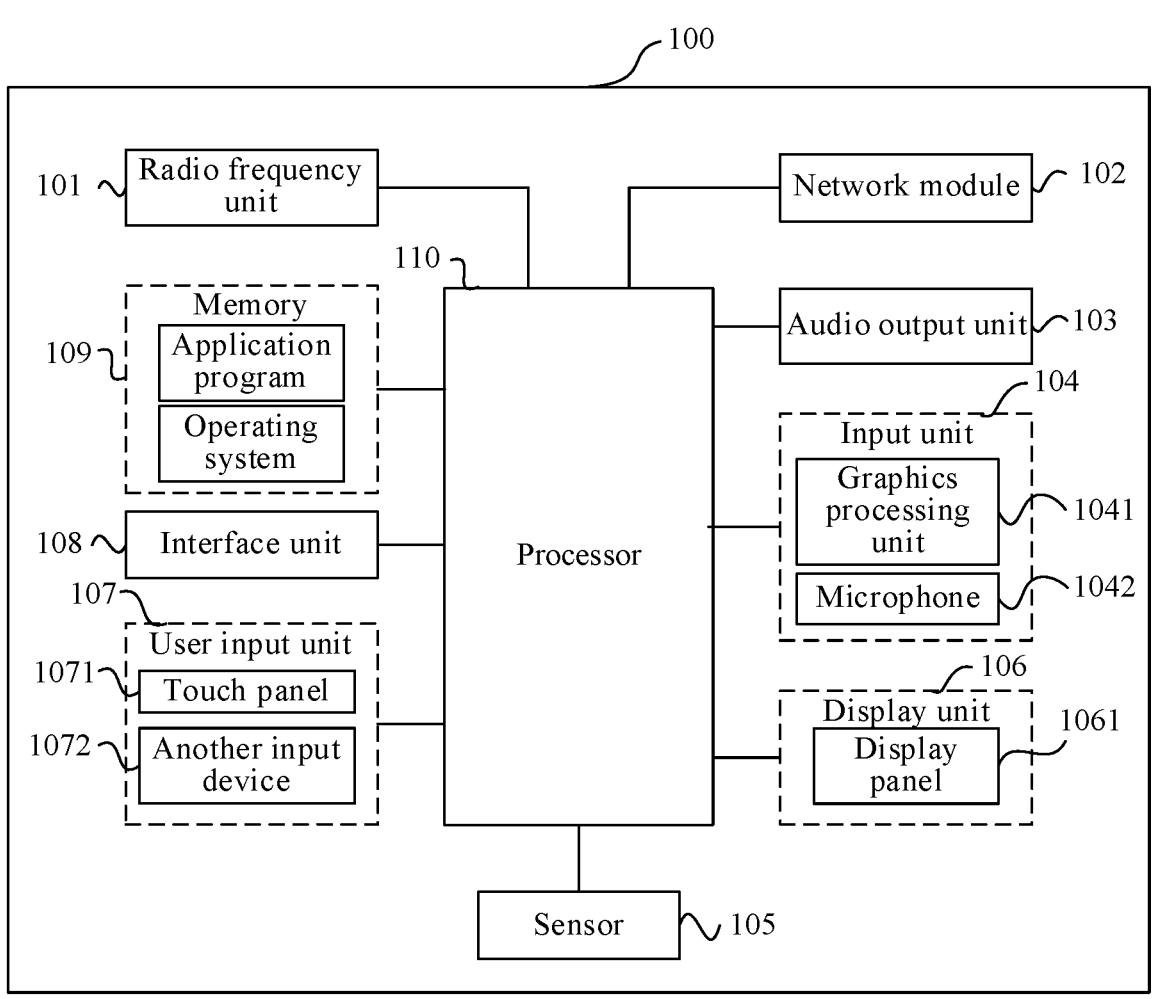
FIG. 10 is a schematic diagram 2 of a hardware structure of a UE according to an embodiment of this application.

FIG. 10 is a schematic diagram of a hardware structure of a UE for implementing the embodiments of this application.

A UE 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the UE 100 may further include a power supply (such as a battery) for supplying power to the components. The power supply may be logically connected to the processor 110 by using a power management system, thereby implementing functions such as charging, discharging, and power consumption management by using the power management system. A UE structure shown in FIG. 10 constitutes no limitation on the UE, and the UE may include more or fewer components than those shown in the figure, or some components may be combined, or a different component deployment may be used, which are not described herein again.

The receiving module 101 is configured to receive first information sent by a network device, where the first information is used for indicating a monitoring behavior of a UE on a downlink control channel, and the first information includes at least one of the following: time information or frequency domain information.

The processor 110 is configured to monitor or stop monitoring a target downlink control channel according to the first information.

According to the UE provided in this embodiment of this application, during monitoring the downlink control channel, because the UE may flexibly monitor a corresponding downlink control channel on time or on frequency domain according to a dynamic indication of the network device, which avoids the delay of data transmission caused by skipping monitoring the downlink control channel, power consumption is reduced. In addition, performance of the data transmission is improved.

It is to be understood that, in this embodiment of this application, the input unit 104 may include a graphics processing unit (GPU) 1041 and a microphone 1042, and the graphics processing unit 1041 processes static pictures or video image data obtained by an image capturing device (such as a camera) in a video capturing mode or an image capturing mode. The display unit 106 may include a display panel 1061, and the display panel 1061 may be configured by using a liquid crystal display, an organic light-emitting diode, or the like. The user input unit 107 includes a touch panel 1071 and another input device 1072. The touch panel 1071 is also referred to as a touch screen. The touch panel 1071 may include two parts: a touch detection apparatus and a touch controller. The another input device 1072 may include, but is not limited to, a physical keyboard, a functional key (such as a volume control key or a switch key), a track ball, a mouse, and a joystick, which are not described herein again. The memory 109 may be configured to store a software program and various data, including, but not limited to an application program and an operating system. The processor 110 may integrate an application processor and a modem processor, where the application processor mainly processes an operating system, a user interface, an application program, and the like, and the modem processor mainly processes wireless communication. It may be understood that the foregoing modem may either not be integrated into the processor 110.

An embodiment of this application further provides a readable storage medium, storing a program or instruction, where when the program or instruction is executed by a processor, each process of the foregoing method embodiments is implemented and the same technical effects can be achieved. Details will not be described herein again to avoid repetition.

The processor is the processor in the UE described in the foregoing embodiment. The readable storage medium includes a computer-readable storage medium, such as, a read-only memory (ROM), a random access memory (RAM), a magnetic disk, or an optical disk.

An embodiment of this application further provides a chip, including a processor and a communication interface, where the communication interface is coupled to the processor, and the processor is configured to run a program or instruction to implement each process of the foregoing method embodiments and the same technical effects can be achieved. Details will not be described herein again to avoid repetition.

It is to be understood that the chip mentioned in this embodiment of this application may also be referred to as a system-level chip, a system chip, a chip system, a system-on-a-chip chip, or the like.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by a sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disk) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. A channel monitoring method, comprising:

receiving, by a user equipment UE, first information sent by a network device, wherein the first information is used for indicating a monitoring behavior of the UE on a downlink control channel, and the first information comprises at least one of the following: time information or frequency domain information; and monitoring or stopping monitoring, by the UE, a target downlink control channel according to the first information;

wherein the monitoring or stopping monitoring, by the UE, a target downlink control channel according to the first information comprises:

monitoring or stopping monitoring, by the UE, the target downlink control channel according to the first information in a case that the UE initiates the competition-based random access process and receives a random access message scheduled by a downlink control channel scrambled by using a specific radio network temporary identifier RNTI.

2. The method according to claim 1, wherein the time information comprises at least one of the following: a start time or an application time, wherein the start time is a time of starting to monitor or starting to stop monitoring the downlink control channel, and the application time is a duration of monitoring or stopping monitoring the downlink control channel; or, the frequency domain information comprises at least one of the following: a preset quantity of cells/component carriers, a bandwidth part BWP, a frequency range, a physical resource block PRB, or a cell group corresponding to a cell.

3. The method according to claim 2, wherein in a case that the first information is downlink control information DCI, the start time is any one of the following: a next time unit, a first time, or a second time;

wherein the next time unit is a next time unit of a time unit in which the DCI is received, the first time is a time determined according to a symbol in which the DCI is received, and the second time is specified in a protocol.

4. The method according to claim 3, wherein in a case that the DCI is a wake up-signal WUS, the start time is a next discontinuous reception DRX duration indicated by the WUS;

in a case that the DCI is used for indicating BWP switching, the start time is a time after the BWP switching;

in a case that the DCI schedules a downlink data channel, the start time is a time determined according to a slot in which the downlink data channel is located and a third slot quantity, and the third slot quantity is a quantity of slots in which uplink control channel transmission feeding back the acknowledgement information to the downlink data channel is located; and in a case that the DCI schedules an uplink data channel, the start time is a time determined according to a slot in which the DCI is located and a quantity of slots in which the uplink data channel is scheduled.

5. The method according to claim 2, wherein the application time is any one of the following: a first duration, a second duration, an end time, a third duration, a target slot, or a monitoring occasion, wherein the first duration is a duration of N continuous or discontinuous short DRX cycles after a time unit in which the first information is received, the second duration is a duration of M continuous or discontinuous long DRX cycles after the time unit in which the first information is received, the end time is a time of finishing monitoring or finishing stopping monitoring the downlink control channel, the third duration is a time length of monitoring or stopping monitoring the downlink control channel, the target slot is a slot of monitoring or stopping monitoring the downlink control channel, the monitoring occasion is an occasion of monitoring or stopping monitoring the downlink control channel, and N and M are both positive integers.

6. The method according to claim 1, wherein the monitoring or stopping monitoring, by the UE, a target downlink control channel according to the first information comprises:

monitoring or stopping monitoring, by the UE, the target downlink control channel according to the first information in a case that a preset condition is met, wherein the preset condition comprises at least one of the following: a cell in which the UE is located is a secondary cell, the cell in which the UE is located is a secondary cell scheduling a primary cell in a cross-carrier manner, a frequency corresponding to the cell in which the UE is located is within a target frequency range, the UE is in a target state, the UE monitors the downlink control channel according to other monitoring-related information, or a BWP on a component carrier corresponding to the downlink control channel is in a non-dormant state.

7. The method according to claim 6, wherein the other monitoring-related information comprises at least one of the following: DRX cycle-related information, a WUS, cross-slot scheduling indication information, or secondary cell dormancy indication information.

8. The method according to claim 1, wherein the target downlink control channel comprises at least one of the following: all downlink control channels in a UE specific search space USS, all downlink control channels in a first preset type of common search space CSS, or a specific downlink control channel; wherein the first preset type of CSS is a type-3 CSS.

9. The method according to claim 8, wherein the specific downlink control channel is configured by a higher layer or indicated by the first information.

10. The method according to claim 9, wherein the first information indicates second information, and the specific downlink control channel is determined by the second information, wherein the second information comprises at least one of the following: a search space set, a DCI format, an aggregation level, a control resource set, a radio network temporary identifier RNTI, or a resource block set.

11. The method according to claim 8, wherein the target downlink control channel comprises at least all the downlink control channels in a first preset type of CSS; and after the receiving, by a UE, first information sent by a network device, the method further comprises:

monitoring, by the UE, a second downlink control channel, wherein the second downlink control channel comprises at least one of the following: all downlink control channels in another type of CSS, a downlink control channel scrambled by an RNTI in the another type of CSS, a downlink control channel other than a downlink control channel scrambled by a specific RNTI in the another type of CSS, or the downlink control channel corresponding to a specific DCI format in the first preset type of CSS; and the another type of CSS is a CSS other than the first preset type of CSS.

12. The method according to claim 1, wherein after the receiving, by a UE, first information sent by a network device, the method further comprises:

transmitting, by the UE, third information in a case that a cell in which the UE is located is a target cell, wherein the third information comprises at least one of the following: first hybrid automatic repeat request-acknowledgment HARQ-ACK information, second HARQ-ACK information, first channel state information CSI, second CSI, a first scheduling request SR, or a second SR;

the target cell is any one of the following: a primary cell, a primary secondary cell, or a secondary cell corresponding to an uplink control channel; and physical layer priorities of the first HARQ-ACK information and the second HARQ-ACK information are different, physical layer priorities of the first CSI and the second CSI are different, and physical layer priorities of the first SR and the second SR are different.

13. The method according to claim 1, wherein after the receiving, by a UE, first information sent by a network device, the method further comprises:

transmitting, by the UE, in a case that the UE is configured with fourth information, the fourth information, wherein the fourth information comprises at least one of the following: a first SR, or a second SR; and physical layer priorities of the first SR and the second SR are different.

14. The method according to claim 13, wherein after the transmitting, by the UE, the fourth information, the method further comprises:

starting, by the UE, a target timer, and monitoring a retransmitted first downlink control channel within a running duration of the target timer, wherein the target timer is a DRX retransmission timer or a DRX-HARQ round-trip time timer; and the first downlink control channel is any one of the following: a downlink control channel in any type of search space, a downlink control channel in a second preset type of CSS, or another downlink control channel other than the target downlink control channel.

15. The method according to claim 1, wherein the monitoring or stopping monitoring, by the UE, a target downlink control channel according to the first information further comprises:

monitoring or stopping monitoring, by the UE, the target downlink control channel according to the first information in a case that the UE does not initiate a competition-based random access process.

16. The method according to claim 1, further comprising:

ignoring, by the UE, the first information in a case that the UE initiates the competition-based random access process and does not receive the random access message scheduled by the downlink control channel scrambled by using the specific RNTI.

17. A user equipment UE, comprising a processor, a memory, and a program or instruction stored on the memory and runnable on the processor, wherein when the program or instruction is executed by the processor, the steps of a channel monitoring method are implemented, and the steps of the channel monitoring method comprises:

receiving, by the UE, first information sent by a network device, wherein the first information is used for indicating a monitoring behavior of the UE on a downlink control channel, and the first information comprises at least one of the following: time information or frequency domain information; and monitoring or stopping monitoring, by the UE, a target downlink control channel according to the first information;

wherein the monitoring or stopping monitoring, by the UE, a target downlink control channel according to the first information comprises:

monitoring or stopping monitoring, by the UE, the target downlink control channel according to the first information in a case that the UE initiates the competition-based random access process and receives a random access message scheduled by a downlink control channel scrambled by using a specific radio network temporary identifier RNTI.

18. The UE according to claim 17, wherein the time information comprises at least one of the following: a start time or an application time, wherein the start time is a time of starting to monitor or starting to stop monitoring the downlink control channel, and the application time is a duration of monitoring or stopping monitoring the downlink control channel; or, the frequency domain information comprises at least one of the following: a preset quantity of cells/component carriers, a bandwidth part BWP, a frequency range, a physical resource block PRB, or a cell group corresponding to a cell.

19. The UE according to claim 18, wherein in a case that the first information is downlink control information DCI, the start time is any one of the following: a next time unit, a first time, or a second time;

wherein the next time unit is a next time unit of a time unit in which the DCI is received, the first time is a time determined according to a symbol in which the DCI is received, and the second time is specified in a protocol.

20. A non-transitory readable storage medium, storing a program or instruction, wherein when the program or instruction is executed by a processor, the steps of a channel monitoring method are implemented, and the steps of the channel monitoring method comprises:

receiving first information sent by a network device, wherein the first information is used for indicating a monitoring behavior of the UE on a downlink control channel, and the first information comprises at least one of the following: time information or frequency domain information; and monitoring or stopping monitoring a target downlink control channel according to the first information;

wherein the monitoring or stopping monitoring a target downlink control channel according to the first information comprises:

monitoring or stopping monitoring, the target downlink control channel according to the first information in a case that the UE initiates the competition-based random access process and receives a random access message scheduled by a downlink control channel scrambled by using a specific radio network temporary identifier RNTI.

* * * * *